Feb. 13, 1945. E. R. GILLILAND 2,369,559
CONCENTRATION OF OLEFINS
Original Filed Dec. 29, 1939   2 Sheets-Sheet 2

Edwin R. Gilliland Inventor
By P L Young Attorney

Patented Feb. 13, 1945

2,369,559

UNITED STATES PATENT OFFICE 2,369,559

CONCENTRATION OF OLEFINS

Edwin R. Gilliland, Cambridge, Mass., assignor, by mesne assignments, to Jasco, Incorporated, a corporation of Louisiana Continuation of application Serial No. 311,467, December 29, 1939. This application August 12, 1943, Serial No. 498,326

10 Claims. (Cl. 260—677)

This invention relates to the separation and concentration of mono-olefins or diolefins in substantially pure form by the use of combined absorption and stripping in the presence of selective solvents.

This application forms a continuation of application Serial No. 311,467, filed December 29, 1939.

In the concentration of olefins or diolefins by the use of selective solvents, such as cuprous salt solutions, the extract of the desired unsaturated compounds is generally contaminated with other undesirable olefins or saturated compounds. Thus, in extracting a gas obtained by cracking petroleum hydrocarbons at elevated temperatures to produce ethylene, propylene is also absorbed, and in extracting butadiene from $C_4$ cuts, butylenes are also absorbed.

According to this invention, these undesirable components are separated by stripping the solutions resulting from the absorption step by the use of the desired component as a stripping agent.

Practical embodiments of the various modifications that may be followed are described with reference to the accompanying drawings in which—

Figure 1:
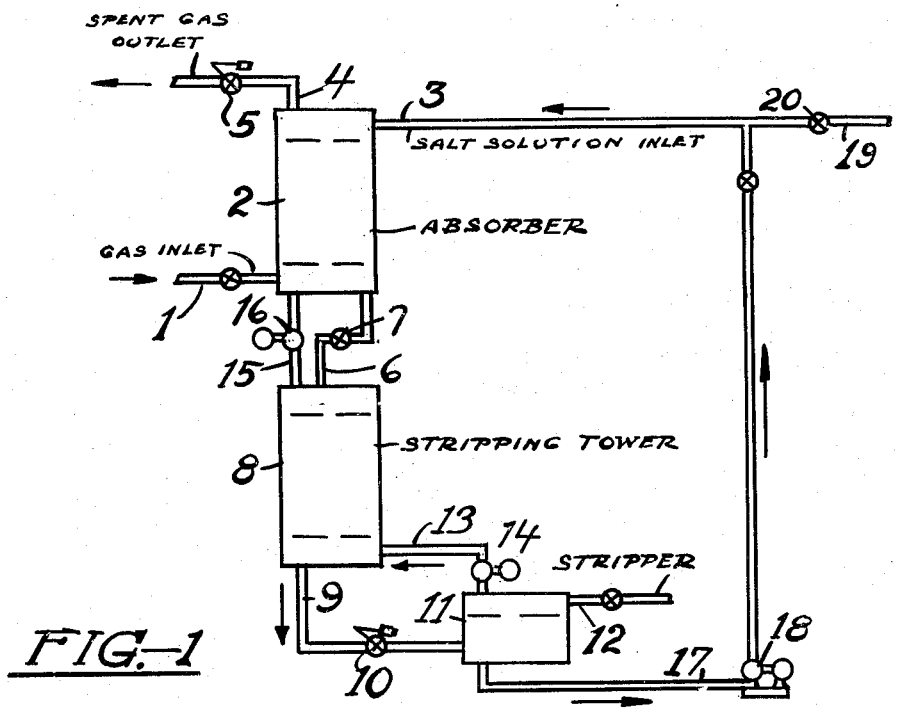
Figure 4:
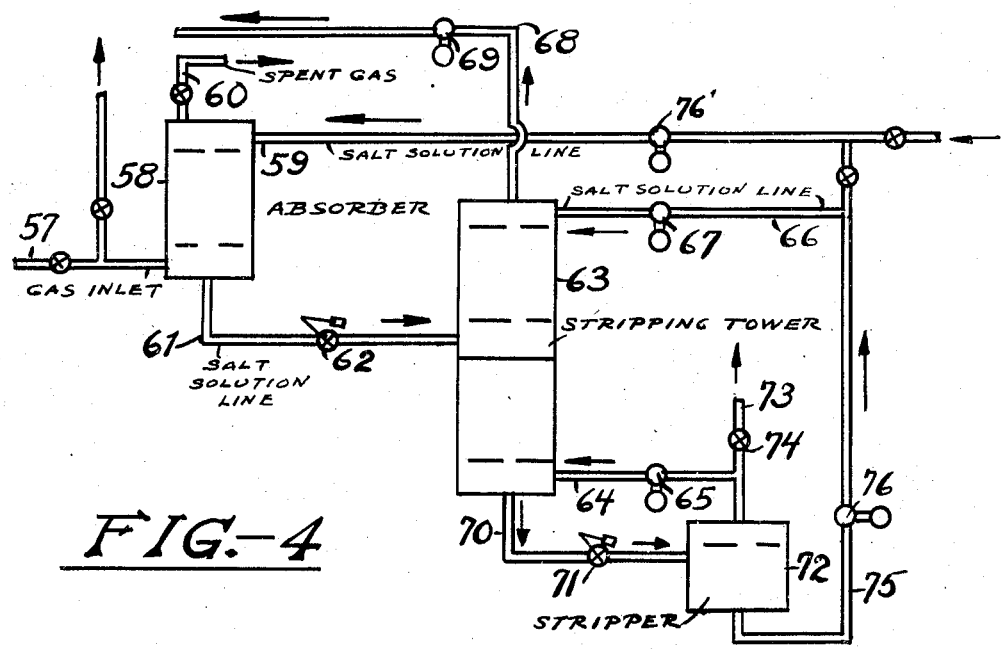

Figs. 1 and 4 are diagrammatic flow sheets.

Referring to Fig. 1, a crude oil cracked gas is first fractionated to obtain a petroleum fraction composed of hydrogen and hydrocarbons having up to 3 carbon atoms to the molecule. This gas is treated with a cuprous salt solvent in an absorber to recover the ethylene, that is, the gas is passed through pipe 1 under an elevated pressure into the bottom of absorber 2 where the gas passes in countercurrent flow to a cuprous salt solvent solution that is passed into the top of absorbing tower 2 by means of pipe 3. The spent or unabsorbed gas consisting mainly of saturated hydrocarbons is expelled through pipe 4 provided with pressure relief valve 5. The cuprous salt solution in absorber 2 absorbs a high percentage of the ethylene and also appreciable amounts of propylene and small amounts of saturated hydrocarbons and with these in solution is passed through pipe 6 provided with pressure relief valve 7 into the top of stripping tower 8. The cuprous salt solution is then withdrawn through pipe 9 provided with pressure relief valve 10 and passed to a stripper 11 where ethylene is flashed off by the lowering of the pressure. Part of the ethylene is withdrawn to storage through pipe 12 and the remaining part by means of pump 14 and pipe 13 is passed into the bottom of stripping tower 8. The ethylene may also be recovered from the cuprous salt solvent by the addition of heat or by both the reduction of pressure and addition of heat. The portion of the ethylene that passes into the bottom of stripping tower 8 strips or effectively removes the propylene and other gases from the cuprous salt solution which is then passed through pipe 15 by means of pump 16 into the bottom of absorber 2. The cuprous salt solution, substantially free of both ethylene and propylene, is passed from stripper 11 through pipe 17 and by means of pump 18 recycled to the top of absorber 2. Additional cuprous salt solution may be added through pipe 19 provided with valve 20.

The stripper can be preferably operated at room temperature or lower and at various pressures, but it is preferred to operate at a pressure high enough so that the solution from the absorber does not flash appreciably upon entering the stripping tower, but at a pressure low enough such that appreciable quantities of the $C_2H_4$ used for stripping does not dissolve. Such a pressure will in general be of the same order as the sum of the partial pressures, in the feed gas to the absorber, of those components of appreciable solubility in the absorbent. Thus, if the feed gas contains 20% $C_2H_4$, 10% $C_3H_6$ and saturates ($H_2$, $CH_4$, $C_2H_6$, etc.) and the absorption pressure is 20 atmospheres, giving olefin partial pressures of 4 atmospheres for $C_2H_4$ and 2 atmospheres for $C_3H_6$, then a stripping pressure of 4 to 6 atmospheres will be suitable, although pressures as low as 3 atmospheres could be used without excessive flashing, and pressures as high as 10 atmospheres could be employed without excessive ethylene absorption. Pressures higher than 10 atmospheres can be used but would result in large quantities of ethylene being absorbed in the stripper. Thus, in the above example the stripper could be operated at 20 atmospheres and the stripper and absorber combined into a single tower with the feed entering somewhere around the middle of the tower. However, under such conditions large quantities of ethylene would be absorbed in the stripper section which would necessitate increased reboiling and increased consumption of $C_2H_4$ as a stripping gas. This high absorption could be reduced by operating the stripper section at a higher temperature than the absorber section, but this is in general not desirable, since increase in temperature usually reduces the selectivity of the solvent and increases the corrosion. Inert gases may likewise be used as stripping agents to remove the less soluble gases from solution in the preferential solvent.

This type of system can be used for other separations such as butadiene from butylenes, isoprene from amylenes, acetylene from ethylene, etc. In some of these systems the operation of the stripper at a pressure lower than the absorber is particularly advantageous.

Thus, in the case of the separation of butadiene from butylene, if the stripper is operated at the same pressure as the absorber, large quantities of butadiene dissolve in the cuprous solutions in the stripper and cause the precipitation of solid complexes which interfere with the satisfactory operation of the stripper.

Various preferential solvents may be used, although the preferred solvent is a basic cuprous chloride solution containing the salts of hydrochlorides of hydroxy alkyl amines. Other solvents, such as those that show a preferential solvent action for olefins, may be used, for example, ammoniacal cuprous nitrate solution, ammoniacal cuprous acetate solution, hydrochloric acid solutions of cuprous chloride and ammonium chloride, etc.

Figure 2:
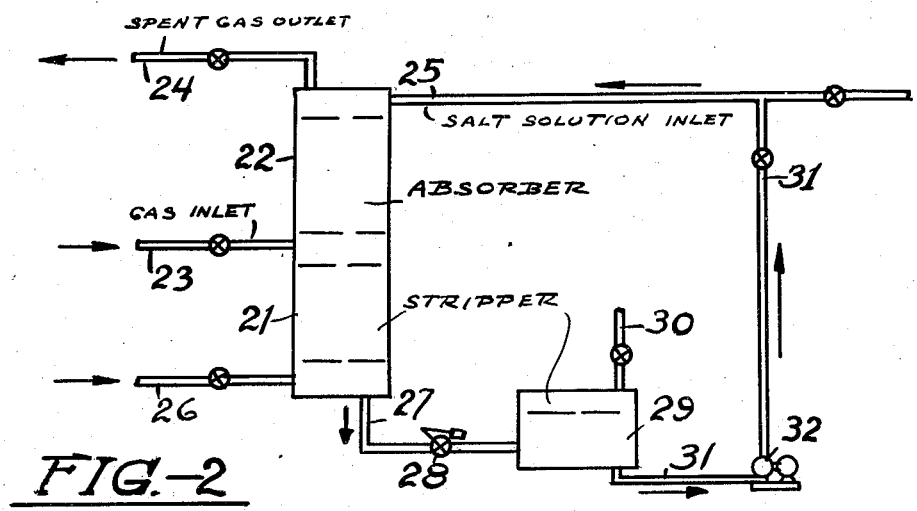

Referring to Fig. 2, a modification of the above process is shown. The stripper 21 and absorber 22 are both operated at the same pressure. The cracked gas containing the olefins and other hydrocarbons is passed through pipe 23 into the absorbing zone 22. The unabsorbed saturated and unsaturated hydrocarbons are removed by means of pipe 24. The cuprous salt solution is introduced into the upper part of absorber 22 through pipe 25. The cuprous salt solution flows from the absorber 22 to the stripping zone 21 and passes in countercurrent flow to a propylene-free gas that is introduced into the bottom of the stripping zone by means of pipe 26. This propylene-free gas is used for stripping and may also contain ethylene, but an ethylene content is not essential as this gas will pick up ethylene in the lower portion of the stripper, which ethylene then acts as a stripping agent. The cuprous salt solution with the ethylene in solution passes through pipe 27 provided with a pressure relief valve 28 into a stripper 29 where by lowering of the pressure ethylene in substantially pure state is separated and removed through pipe 30, the cuprous chloride salt solution being withdrawn through pipe 31 and passed by means of pump 32 into the upper part of the absorption zone 22.

Figure 3:
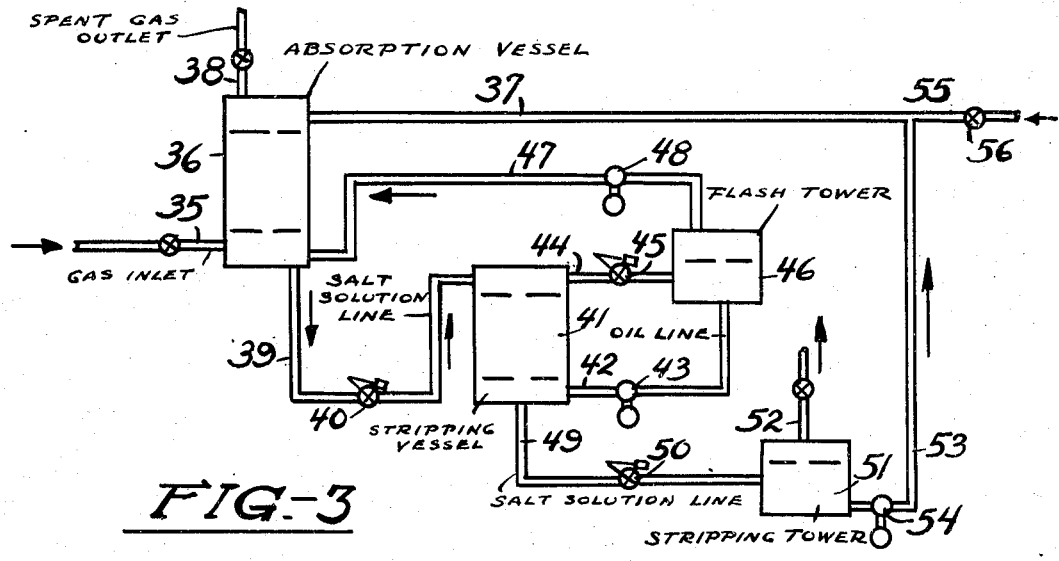

Referring to Fig. 3, another modification of this process is disclosed, wherein oil is used to strip the undesirable olefins from the preferential solvent that contains the olefins in solution. A cracked gas containing the olefins in solution is passed through pipe 35 into the lower part of an absorption zone 36 where it flows in countercurrent flow to a preferential solvent that absorbs the olefin that is introduced into the upper part of the absorption vessel 36 by means of pipe 37. The unabsorbed gases which are mainly saturated gases, such as paraffins, are removed through pipe 38. The cuprous salt solution with the absorbed olefins is passed through pipe 39 provided with pressure relief valve 40 into the upper part of stripping vessel 41 where it passes in countercurrent flow to an oil that is passed through pipe 42 by means of pump 43 into the lower part of stripping zone 41. The oil passes upwardly through the stripping zone 41 and is removed through pipe 44 provided with a relief valve 45 into a flash tower 46 where the components that were removed in the stripping operation are flashed off and returned by means of pipe 47 and pump 48 into the lower part of the absorber 36. An oil substantially free of the olefins is then recycled to stripping tower 41. The cuprous salt solution free of undesirable olefins is then passed through pipe 49 provided with a relief valve 50 into stripping tower 51 where ethylene is recovered through pipe 52 and the cuprous salt solution recycled to the absorber 36 by means of pipe 53 and pump 54. Additional cuprous chloride may be added through pipe 55 provided with valve 56. The pressure is reduced to separate the desired olefin from the cuprous salt solution.

Referring to Fig. 4, another modification of the method is shown, in which both ethylene and propylene in concentrated form may be obtained. Through pipe 57 a cracked olefin gas containing ethylene and propylene is passed into the lower part of absorber 58 where it passes in countercurrent flow to a cuprous salt solution or other preferential solvent solution to absorb the olefins, which cuprous salt solution is introduced into the upper part of absorber 58 by means of pipe 59. The unabsorbed gases are removed through pipe 60 and consist mainly of saturated hydrocarbons. The cuprous salt solution is then passed through pipe 61 provided with pressure relief valve 62 into the central part of stripping tower 63. The cuprous salt solution flows downwardly through the lower part of the stripping tower in countercurrent flow to the ethylene which is introduced into the lower part of the tower by means of pipe 64 and pump 65. The olefin, freed of ethylene by means of the absorbing action, passes upwardly of the stripping tower 63 in countercurrent flow in the upper part of the stripping tower to a cuprous salt solvent which is introduced by means of pipe 66 and pump 67. The unabsorbed gases of concentrated propylene are removed through pipe 68 to storage. The cuprous salt solution with the ethylene is withdrawn from the bottom of the stripping tower 63 through pipe 70 provided with pressure relief valve 71 and passed into a stripping zone 72 where the cuprous salt solution is freed of the ethylene which is part recycled through pipe 64 to the stripping zone and part withdrawn through pipe 73 provided with valve 74 to storage. The cuprous salt solution is withdrawn from the bottom of the stripper 72 and passed through pipe 75 and recycled by means of pump 76 and pump 67 to the absorption and stripping towers.

When liquid fractions, such as isoprene, are to be extracted from other hydrocarbons containing 5 carbon atoms to the molecule, the same type of system can be used, although it may be preferable to use a series of mixers instead of towers. For this stripping operation, the oil stripping method is the most convenient method of operation.

These various methods of recovering olefins from mixtures of olefins and paraffins were described with an example showing the recovery and concentration of ethylene, but it is not intended to limit these methods to this particular use, as these methods are especially applicable for the separation and concentration of diolefins from mixtures of olefins and diolefins, or mixture of olefins, diolefins, saturated hydrocarbons and other compounds.

The temperature used for absorbing ethylene is about 50° F. or lower depending on the pressure. It is preferred to operate at one temperature in both the absorption and deabsorption steps. Higher temperatures may be used for deabsorption, although the temperatures preferred are about 50° F. or less for both steps.

I claim:

1. The method of separating and concentrating an olefin which comprises contacting a mixture of hydrocarbons containing the desired olefin with a preferential solvent that forms an addition compound with the said desired olefin, stripping undesirable ingredients from the said preferential solvent with the said addition compound dissolved therein by the use of a hydrocarbon stripping agent substantially free of any of the undesirable ingredients and recovering the desired olefin from the said solvent.

2. The method of separating and concentrating an olefin which comprises contacting a mixture of hydrocarbons containing the desired olefin with a preferential solvent that forms an addition compound with the said desired olefin, stripping the undesirable ingredients from the said preferential solvent with the said addition compound dissolved therein by the use of the desired olefin as a stripping agent and recovering the desired olefin from the said solvent.

3. The method of separating and concentrating an olefin which comprises contacting a mixture of hydrocarbons containing the desired olefin with a preferential solvent that forms an addition compound with the said desired olefin, stripping undesirable ingredients from the said preferential solvent with the said addition compound dissolved therein by the use of an inert petroleum oil and recovering the desired olefin from the said solvent.

4. The method of separating and concentrating a diolefin which comprises contacting a mixture of hydrocarbons containing the desired diolefin with a preferential solvent that forms an addition compound with the said desired diolefin, stripping undesirable ingredients from the said preferential solvent with the said addition compound dissolved therein by the use of the desired diolefin as a stripping agent and recovering the desired diolefin from the said solvent.

5. The method of separating and concentrating ethylene which comprises contacting a mixture of hydrocarbons containing ethylene with a preferential solvent that forms an addition compound with ethylene, stripping undesirable ingredients from the said preferential solvent with the said addition compound of ethylene dissolved therein by the use of ethylene as a stripping agent and recovering ethylene from the said solvent.

6. The method of separating and concentrating ethylene which comprises contacting a mixture of hydrocarbons containing ethylene with a preferential solvent that forms an addition compound with ethylene, stripping undesirable ingredients from the said preferential solvent with an addition compound of ethylene dissolved therein by the use of an inert petroleum oil as a stripping agent and recovering ethylene from the said solvent.

7. The method of separating and concentrating butadiene which comprises contacting a mixture of hydrocarbons containing butadiene with a preferential solvent that forms an addition compound with butadiene, stripping undesirable ingredients from the said preferential solvent with the addition compound of butadiene dissolved therein by the use of butadiene as a stripping agent and recovering butadiene from the said solvent.

8. A method of separating and concentrating ar olefin which comprises contacting a mixture of hydrocarbons containing the desired olefin with an aqueous cuprous salt solution that forms an addition compound with the said desired olefin, stripping undesirable ingredients from the said preferential solvent with the said cuprous salt addition compound of the desired olefin dissolved therein by the use of the desired olefin as a stripping agent and recovering the desired olefin from the said solvent.

9. The method of separating and concentrating a diolefin which comprises contacting a mixture of hydrocarbons containing the desired diolefin with an aqueous cuprous salt solution that forms an addition compound with the said desired diolefin, stripping undesirable ingredients from the said aqueous cuprous salt solution with the addition compound of the diolefin and cuprous salt dissolved therein by the use of the desired diolefin as a stripping agent and recovering the desired diolefin from the said solvent.

10. The method of separating and concentrating butadiene which comprises contacting a mixture of hydrocarbons containing butadiene with an aqueous ammoniacal cuprous acetate solution that forms an addition compound with the butadiene, stripping undesirable ingredients from the aqueous ammoniacal cuprous acetate solution with the addition compound of butadiene and the ammoniacal cuprous acetate dissolved therein by the use of butadiene as a stripping agent and recovering butadiene from the said solvent.

EDWIN R. GILLILAND.